Patented Mar. 12, 1935

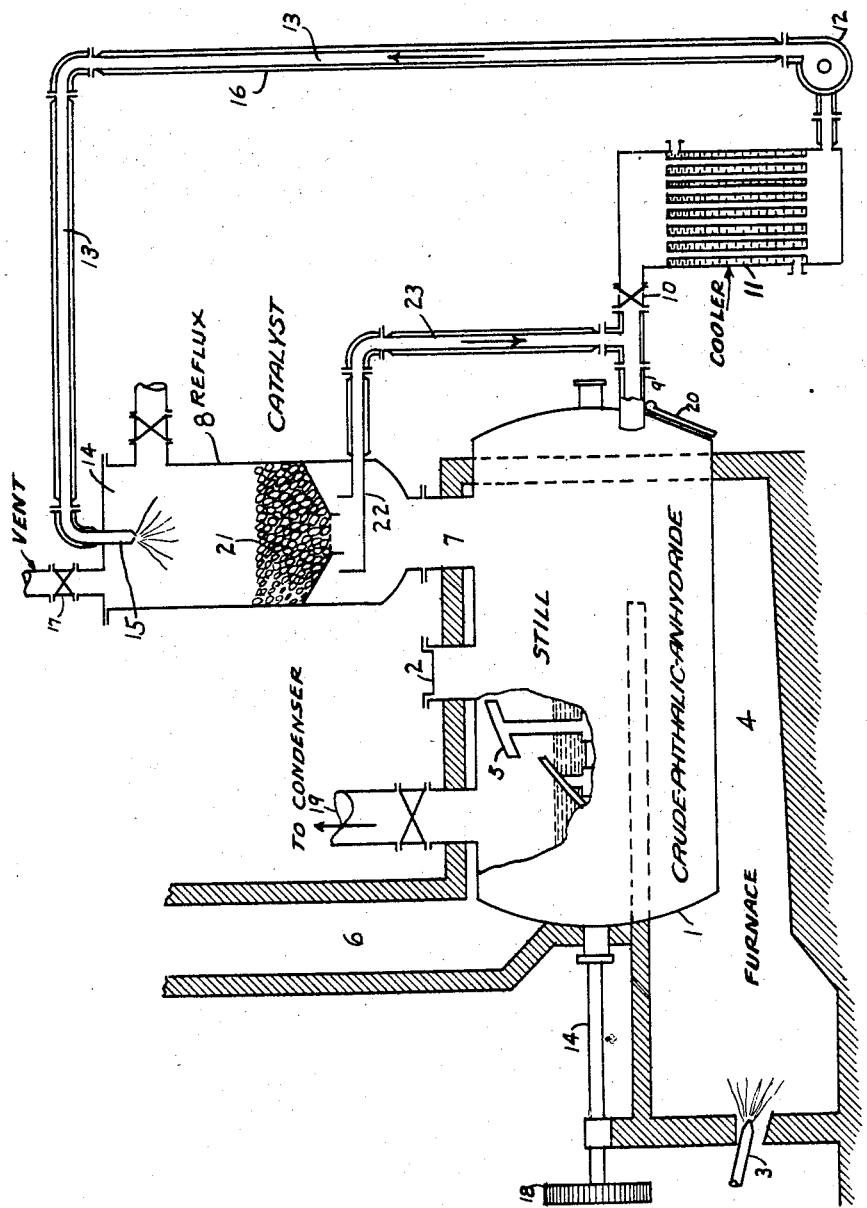

1,993,886

UNITED STATES PATENT OFFICE 1,993,886

METHOD FOR CARRYING OUT OF MOLECULAR ASSOCIATIONS AND TRANSFORMATIONS

Alphons O. Jaeger, Crafton, and Kurt F. Pietzsch, Pittsburgh, Pa., assignors, by mesne assignments, to American Cyanamid & Chemical Corporation, a corporation of Delaware Application June 29, 1928, Serial No. 289,229

9 Claims. (Cl. 260—123)

This invention relates to methods for carrying out molecular associations and transformations. The term "molecular associations" is used to define reactions in which the desired product is produced by the association of two or more molecules of similar or dissimilar substances such as polymerizations, in which the molecules to be united are the same, and condensation reactions, in which the reacting molecules are different. Such reactions may take place either with or without the splitting off of water or other by-products. The term "molecular transformations" is used to refer to such isomerizations as intramolecular rearrangements, in which the desired product is produced by a rearrangement of the atoms of a molecule, with or without splitting off by-products or taking up additional atoms.

Molecular associations and transformations of various types, such as condensations, polymerizations, and the like, frequently require high temperature and prolonged heating. As the products are frequently relatively non-volatile and frequently relatively high melting, considerable problems arise which render some ordinary types of batch heating undesirable. Molecular transformation reactions such as isomerizations require similar treatments. A typical example of such reactions is the transformation of maleic acid into fumaric acid, and the like, either as a method of rendering maleic acid non-volatile when it is present as an impurity, for example in crude phthalic anhydride, or for producing fumaric acid as a product. The various reactions, both association and transformation, may be carried out at atmospheric pressures or at pressures above or below the atmosphere, the best pressure being determined by the conditions of the particular reaction.

According to the present invention molecular associations are carried out by circulating a liquid mixture through the vapors of the mixture in a reflux condenser. The operation is thus continuous and preferably the liquid mixture should be circulated or sprayed in countercurrent to the vapors. The vapor phase may be produced by heating the liquid phase or it may be a separate gas or vapor; this will depend on whether the reacting components are all solids or a mixture or whether one or more of the components are gases. Thus, for instance, many crude organic compounds, such as, for example, phthalic anhydrides produced by the catalytic vapor phase oxidation of naphthalene, contain considerable amounts of alphanaphthaquinone, maleic acid and similar bodies which are capable by molecular association of being transformed into relatively non-volatile substances which can be easily separated from the phthalic anhydride by vaporization. Other crude organic materials may be subjected to a similar treatment followed by vaporization of the volatile from the non-volatile substances. The present process is, therefore, especially applicable to the purification of products such as crude phthalic anhydride and the molecular association which takes place may be accelerated by the addition of catalysts, either volatile or non-volatile, or by the use of physical catalysts, such as extended rough surfaces or porous material. Catalysts which are non-volatile should preferably be placed in the reflux condenser or the chamber in which the liquid and vapor contact. The intimate contact between the liquid and vapor in the countercurrent circulation appears to bring about a much more rapid and complete condensation or polymerization than is possible with heating alone. It is frequently desirable that the sprayed liquid should be sufficiently cooled to bring about condensation of the vapors into which it is sprayed and such a process may be considered as the preferred embodiment of the present invention for the purification of organic materials, such as phthalic anhydride, naphthalic anhydride, benzoic acid, etc.

Other reactions require molecular association by reaction of two separate classes of compounds as, for example, in hydrogenations where the material to be hydrogenated is sprayed through hydrogen or hydrogen-containing gases; esterifications where one or more of the constituents is sprayed through the vapor of one or more of the other components, in which case the vaporizing chamber may advantageously be maintained at a high temperature to distill off water formed, particularly when esterification takes place in the presence of a component which forms with water an azeotropic mixture. Catalysts solid or gaseous may be present in the condensation chamber or in the case of esterifications soluble catalysts, such as sulfuric acid, may be present in the liquid phase. It should be understood that the present invention does not ordinarily contemplate the use of finely divided contact masses suspended in the liquid which has been found to be relatively unsatisfactory, although for the purification of phthalic anhydride and similar compounds suspended solid catalysts may sometimes be used with advantage.

The invention is applicable to the purification of all volatile organic compounds which contain impurities capable of forming relatively less volatile products by molecular association, such as condensations, polymerizations, and the like. Other synthetic reactions, such as condensation and polymerization reactions with or without catalysts, such as, for example aldolizations and crotonizations are important, also the production of intermediate stages of artificial resins, resins produced by polymerization or condensations, and the like. Reductions and hydrogenations of organic compounds using elementary hydrogen in the presence of suitable contact masses can also be effectively carried out partly in the vapor and partly in the liquid phase at any desired pressure. The hydrogen may also be recirculated so that there are two circulations, one of liquid and one of gas.

The invention is also applicable to the oxidation of organic substances, halogenations, and the like. Various reactions in which groups are split off such as hydrogen, oxygen or nitrogen containing groups, halogens and the like may be carried out, as can many metatheses such as synthesis of amines by reaction of halogen compounds with ammonia, such as the production of aniline from chlorbenzene, with or without catalysts, and the like. The transformation of cyanamide into urea is another example of reaction. In fact the process is generally applicable to organic reactions which are carried out partly in the vapor and partly in the liquid phase.

The invention will be described in greater detail in connection with the drawing which illustrates a typical apparatus for carrying out the principles of the present invention, the apparatus being particularly designed for the purification of crude phthalic anhydride by molecular association or transformation of quinonoid and other impurities. The apparatus consists of a still 1 in a furnace 4, heated by a burner 3. An opening 2 serves for charging and an opening 19 leads to an external condenser (not shown), for distilling off products after the reaction has been completed. The still is provided with an agitator 5 which also acts as a scraper for scraping solid material from the sides of the still. A reflux condenser 8 is connected to the still through the pipe 7 and may be provided, if desired, with suitable catalysts or with filling bodies 21 to increase the surface of contact. From a point below the liquid level of the still a pipe 9 controlled by a valve 10 leads into a cooler 11, whence a pump 12 forces the liquid through a pipe 13 provided with a jacket 16 to a spray nozzle 15 in the reflux condenser 8. A suitable vent 17 may also be provided. The agitator is driven by a shaft 14 carrying a gear 18 and can be used both for agitating the liquid content of the still and for scraping out still residue through the discharge opening 20.

The still as shown is provided with a liquid catchall 22 leading through a jacketed pipe 23 to the pipe 9. Most of the condensate is thus returned into pipe 9, where a major portion is immediately recirculated. This prevents cooled condensate from being returned directly into the still, which would tend to reduce the rate of ebullition and correspondingly the amount of vapors in the still.

In operation, when used for the purification of phthalic anhydride, the latter is charged in through the opening 2 until the still is filled to the desired level; the opening is then closed and the still heated until the vapors of phthalic anhydride begin to reflux, the agitator being started in the meantime. The pump 12 then draws the liquid phthalic anhydride from the cooler 11 and discharges it through the spray nozzle 15 where it serves to condense the rising vapors and comes intimately in contact therewith. Condensible, polymerizable and isomerizable material is rapidly transformed into a non-volatile form, and the valve in the pipe 19 is opened, the phthalic anhydride being distilled off and being condensed in the usual manner until the still residue has reached a certain consistency, at which point the distillation is stopped and the still residue is discharged through the opening 20. While the circulating process is continued the agitator may be run in either direction; it is preferable, however, during distillation and especially near the end of the distillation to run the agitator first in one direction and then in the other to avoid piling up solid material in the far end of the still from which it cannot be so readily discharged.

When the apparatus is to be used for esterification, alcohol and acid, with or without sulfuric acid, is charged into the still and preferably a third component is added, such as benzol or similar relatively inert material which forms with water an azeotropic mixture. Esterification takes place as described in connection with the phthalic anhydride purification and, if desired, the vapors of the azeotropic mixture may be permitted to escape through the pipe 17, thus continuously removing a considerable quantity of water formed during reaction. After the reaction has been carried as far as desired the product is distilled off. The reflux condenser may contain contact masses which favor esterification or it may contain filling bodies to increase the surface of contact between the vapor and the sprayed liquid. When used for esterification it is sometimes desirable to omit the catchall and to return the condensate directly to the still. Either arrangement, of course, can be used.

Where the treatment of a liquid with a gas is to be carried out as for example in hydrogenations and reduction of organic compounds, hydrogen or hydrogen containing gases may be introduced into the liquid in the still in any suitable manner and after bubbling therethrough passes up through the reflux condenser 8 in countercurrent to the down-spraying liquid and escapes through the pipe 17 and then, if necessary after suitable treatment to remove reaction products, it may be recirculated. Such a recirculating system is well known in the art and has not been particularly illustrated in the drawing. If desired, of course, the hydrogen or other reducing gases may be introduced only into the reflux condenser where it is desired to maintain the reaction primarily in the vapor phase.

The drawing shows merely a diagrammatic apparatus in which the reactions embodying the principles of the present invention can be carried out. It should be understood that various other designs of apparatus may be used and in general the most suitable apparatus will be chosen in connection with each particular reaction, due regard being paid to the conditions under which the reaction is carried out.

What is claimed as new is:

1. A method of bringing about reactions resulting in the transformation of at least one liquefiable, volatilizable organic compound contained in a mixture of normally liquid organic compounds into a compound having a larger number of atoms in its molecule which comprises subjecting a normally liquid mixture of products, at least one of which is a volatile organic compound, to heat sufficient to volatilize one of the components, and spraying part of the liquid mixture into the vapors produced.

2. A method according to claim 1, in which the vapors are maintained at such a temperature that after contact with the liquid spray at least a portion of the mixture produced is condensed and is recirculated through the spray.

3. A method of effecting reactions of polycomponent mixtures in which the component containing the largest number of atoms in the molecule is transformed into a compound containing an increased number of atoms in the molecule and at least one component is volatile and capable of remaining in the vapor state at a temperature below the boiling point of the highest boiling reaction product formed, which comprises subjecting the mixture to boiling and spraying a part of the liquid portion thereof into the vapors, the zone of contact of sprayed liquid and vapor being maintained at a temperature sufficiently high to continuously maintain at least one component of the mixture in the vapor state and low enough to maintain at least one reaction product in non-gaseous form, and continuously removing the component or mixture of components which are maintained in the gaseous state.

4. A method according to claim 3 in which the liquid component is continuously sprayed into the reaction component at a temperature at which at least part of the liquid component remains in the liquid state and is recirculated through the spray.

5. A method of effecting organic reactions in polycomponent mixtures in which reactions the component containing the largest number of atoms in the molecule is transformed into a compound containing an increased number of atoms in the molecule, at least one component of the mixture being a liquid which boils substantially at reaction temperatures, which comprises causing the liquid to boil and spraying at least a part of the liquid into the vapors evolved.

6. A method of purifying mixtures of volatilizable organic compounds containing at least one component capable of transformation into a relatively non-volatile product by condensation and polymerization reactions, which comprises boiling the mixture and continuously spraying a portion of the liquid into the vapors evolved at a temperature at which at least part of the components will assume the liquid form.

7. A method of purifying the crude products of the partial catalytic oxidation of aromatic compounds, which crude products contain impurities capable of being rendered relatively non-volatile by condensation and polymerization reactions, which comprises boiling the crude product and spraying a portion of the liquid part of the mixture into the vapors at a temperature such that part at least of the components will assume the liquid state.

8. A method of purifying crude phthalic anhydride produced by the catalytic vapor phase oxidation of naphthalene, which comprises boiling the product and continuously spraying a portion of the liquid phase into the vapors at a temperature such that phthalic anhydride condenses.

9. A method of purifying crude phthalic anhydride produced by the catalytic vapor phase oxidation of naphthalene, which comprises boiling the product and continuously spraying a portion of the liquid phase into the vapors at a temperature such that phthalic anhydride condenses, and recirculating the condensed phthalic anhydride.

ALPHONS O. JAEGER.
KURT F. PIETZSCH.